US012657221B2

(12) United States Patent
Ajmera et al.

(10) Patent No.: US 12,657,221 B2
(45) Date of Patent: Jun. 16, 2026

(54) ACCELERATED KNOWLEDGE DISCOVERY FOR KNOWLEDGE BASE

(71) Applicant: Intuit Inc., Mountain View, CA (US)

(72) Inventors: Rakesh Ajmera, Cambridge, MA (US); Shwetha Kalyanathaya Shashidhara, Bangalore (IN); Bhargavan Muthuselvan, San Diego, CA (US); Vajreshwari April Jernberg, Mountain View, CA (US); Kayla Ann Nussbaum, New Hope, PA (US); Pranika Jain, San Diego, CA (US); Roddam Harshavardhan Reddy, Bangalore (IN); Krishna Chaitanya Chavatapalli, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/934,130

(22) Filed: Oct. 31, 2024

(65) Prior Publication Data

US 2026/0119539 A1 Apr. 30, 2026

(51) Int. Cl.
*G06N 20/00* (2019.01)
*G06F 16/00* (2019.01)
(Continued)

(52) U.S. Cl.
CPC ........ G06F 16/3329 (2019.01); G06F 16/332 (2019.01); G06F 16/3334 (2019.01);
(Continued)

(58) Field of Classification Search
CPC .... G06F 16/3329; G06F 16/93; G06F 16/332; G06F 16/345; G06F 16/25; G06F 16/316;
(Continued)

(56) References Cited

U.S. PATENT DOCUMENTS

| | | | | |
|---|---|---|---|---|
| 12,020,140 | B1 * | 6/2024 | Mondlock | G06N 3/0455 |
| 2022/0139384 | A1 * | 5/2022 | Wu | G06F 40/35 |
| | | | | 704/257 |

(Continued)

FOREIGN PATENT DOCUMENTS

| | | | |
|---|---|---|---|
| WO | WO 2019027259 A1 * | 2/2019 | |
| WO | WO 2024020674 A1 * | 2/2024 | |

OTHER PUBLICATIONS

Cheng'an Wei et al., "Hidden in Plain Sight Exploring Chat History Tampering inInteractive Language Models", arXiv:2405.20234v3 [cs.AI] , Sep. 6, 2024,. pp 1-19.*

(Continued)

*Primary Examiner* — Srirama Channavajjala
(74) *Attorney, Agent, or Firm* — Lathrop GPM LLP

(57) ABSTRACT

A method includes iteratively executing a pre-processing document processing loop using a large language model (LLM). The pre-processing document processing loop includes analyzing a raw document to obtain a modification recommendation. The raw document is modified based on the modification recommendation to obtain an improved document. A document style rule set is applied to the improved document to obtain a styled document. The styled document is augmented with a semantic context to obtain a discoverable document, until the discoverable document achieves a document readiness score greater than a document readiness threshold. The method further includes executing a post-processing document processing phase using the LLM. The post-processing document processing phase includes generating an answer to a user query from a discoverable document embedding corresponding to the discoverable document. The discoverable document is further updated by executing the pre-processing document
(Continued)

processing loop, with the semantic context including the user chat history.

17 Claims, 7 Drawing Sheets

(51) Int. Cl.

| | |
|---|---|
| *G06F 16/332* | (2019.01) |
| *G06F 16/3329* | (2025.01) |
| *G06F 16/3332* | (2025.01) |
| *G06F 16/3349* | (2025.01) |
| *G06F 16/34* | (2019.01) |
| *G06F 16/93* | (2019.01) |
| *G06N 3/00* | (2023.01) |
| *G06N 3/0455* | (2023.01) |
| *G06N 3/0475* | (2023.01) |

(52) U.S. Cl.
CPC ........ *G06F 16/3349* (2019.01); *G06F 16/345* (2019.01); *G06F 16/93* (2019.01); *G06N 3/0455* (2023.01); *G06N 3/0475* (2023.01); *G06N 20/00* (2019.01)

(58) Field of Classification Search
CPC .. G06F 16/3334; G06F 16/3349; G06F 40/00; G06F 40/30; G06F 40/16; G06F 40/35; G06N 3/0455; G06N 3/0475; G06N 20/00; H04L 69/324
See application file for complete search history.

(56) References Cited

U.S. PATENT DOCUMENTS

| | | | | |
|---|---|---|---|---|
| 2024/0160772 A1* | 5/2024 | Weggenmann | ....... | G06F 40/284 |
| 2024/0354501 A1* | 10/2024 | Bouguerra | ............ | G06F 40/205 |
| 2024/0430216 A1* | 12/2024 | Abraham | ................ | H04L 51/04 |
| 2025/0103622 A1* | 3/2025 | Addanki | ............. | G06F 16/3329 |
| 2025/0117630 A1* | 4/2025 | Taheri | .................. | G06N 3/0895 |
| 2025/0209297 A1* | 6/2025 | Reid | ...................... | G06N 3/006 |
| 2025/0238470 A1* | 7/2025 | Penta | .................. | G06F 16/9535 |
| 2025/0252445 A1* | 8/2025 | Gaddam | ................. | H04L 51/02 |

OTHER PUBLICATIONS

Siqing Huo, "Retrieving Supporting Evidence for Generative Question Answering", SIGIR-AP '23: Proceedings of the Annual International ACM SIGIR Conference on Research and Development in Information Retrieval in the Asia Pacific Region, Nov. 26, 2023, pp. 11-20.*

* cited by examiner

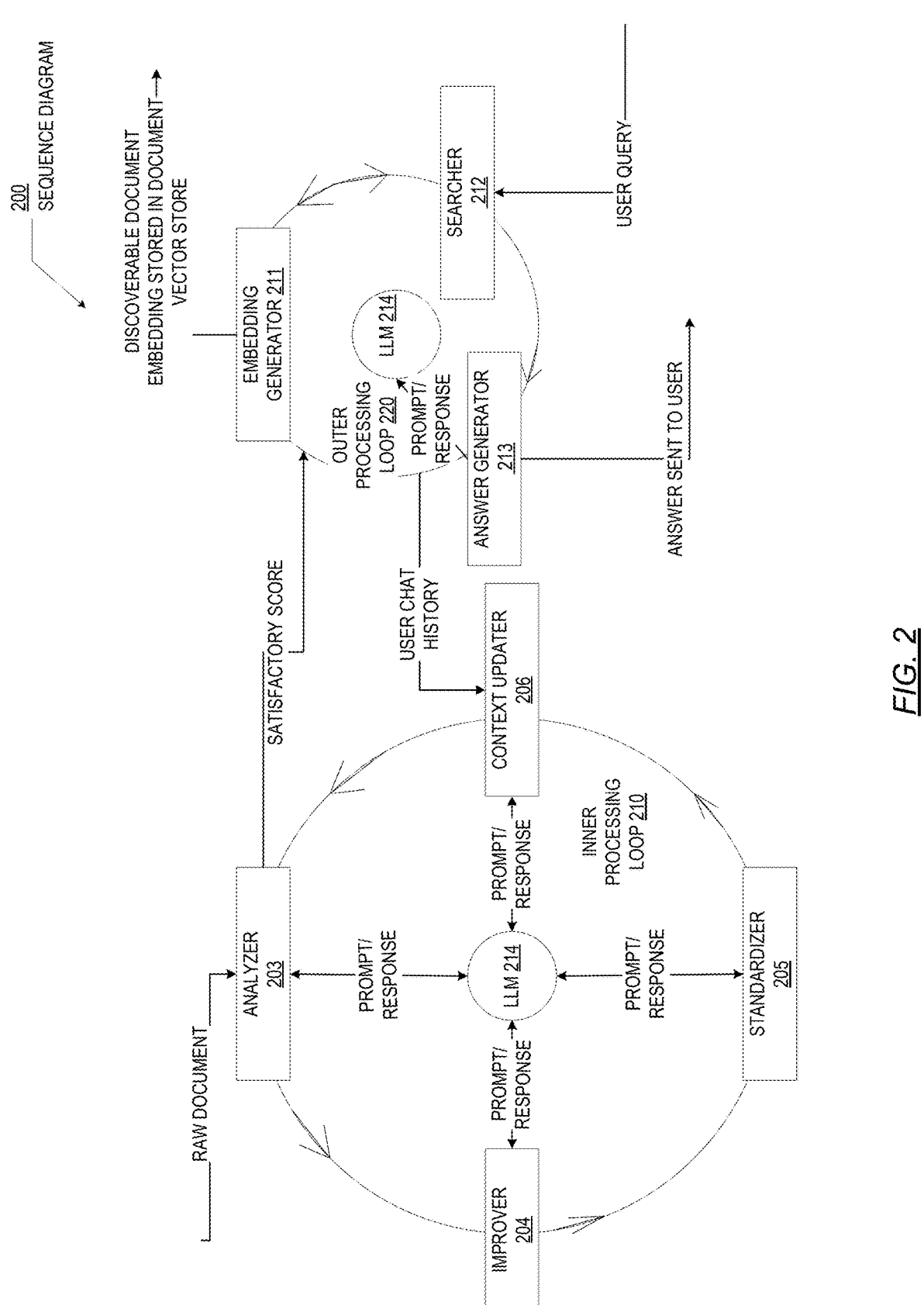
_FIG. 2_

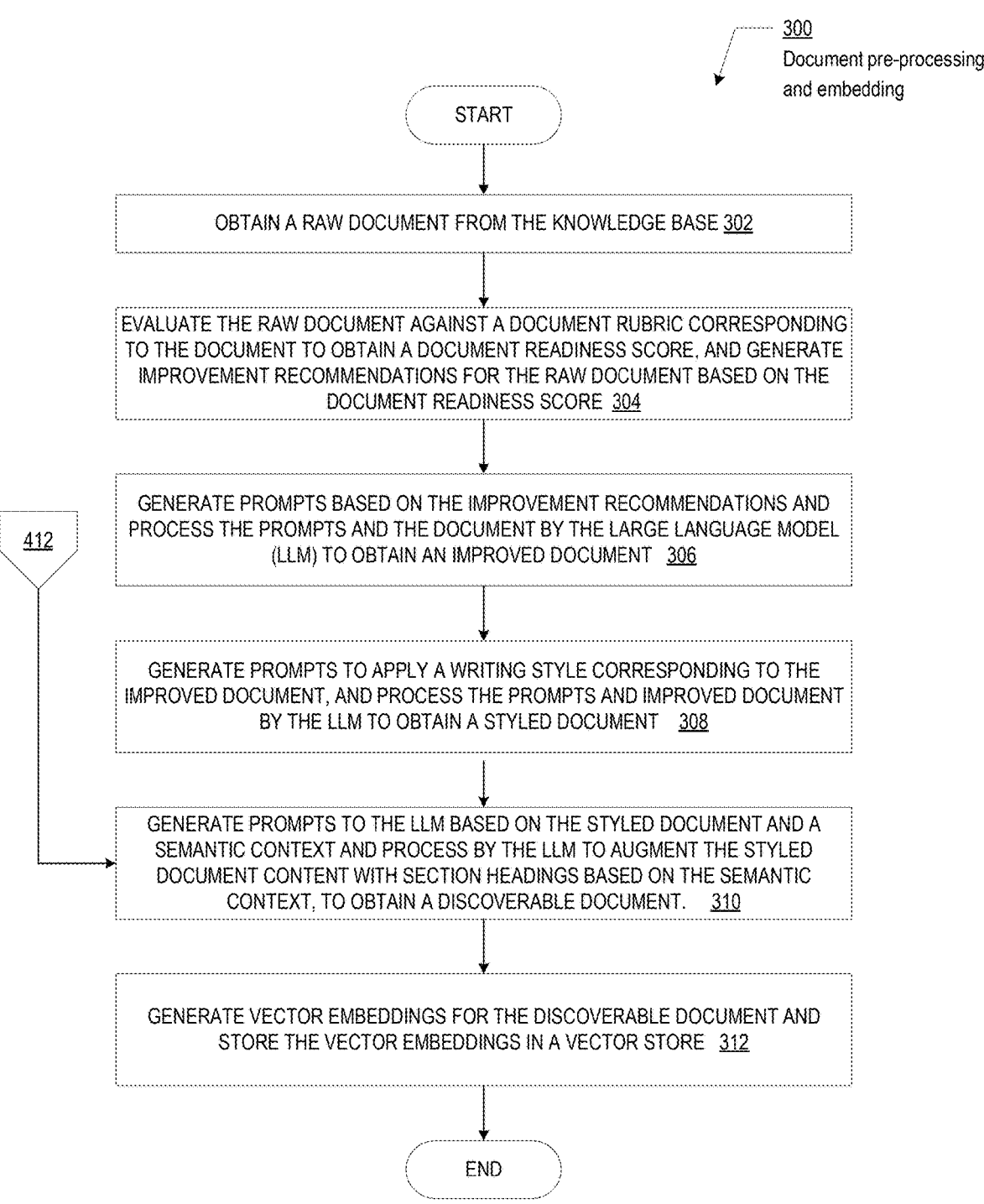

300
Document pre-processing
and embedding

START

OBTAIN A RAW DOCUMENT FROM THE KNOWLEDGE BASE 302

EVALUATE THE RAW DOCUMENT AGAINST A DOCUMENT RUBRIC CORRESPONDING TO THE DOCUMENT TO OBTAIN A DOCUMENT READINESS SCORE, AND GENERATE IMPROVEMENT RECOMMENDATIONS FOR THE RAW DOCUMENT BASED ON THE DOCUMENT READINESS SCORE 304

GENERATE PROMPTS BASED ON THE IMPROVEMENT RECOMMENDATIONS AND PROCESS THE PROMPTS AND THE DOCUMENT BY THE LARGE LANGUAGE MODEL (LLM) TO OBTAIN AN IMPROVED DOCUMENT 306

412

GENERATE PROMPTS TO APPLY A WRITING STYLE CORRESPONDING TO THE IMPROVED DOCUMENT, AND PROCESS THE PROMPTS AND IMPROVED DOCUMENT BY THE LLM TO OBTAIN A STYLED DOCUMENT 308

GENERATE PROMPTS TO THE LLM BASED ON THE STYLED DOCUMENT AND A SEMANTIC CONTEXT AND PROCESS BY THE LLM TO AUGMENT THE STYLED DOCUMENT CONTENT WITH SECTION HEADINGS BASED ON THE SEMANTIC CONTEXT, TO OBTAIN A DISCOVERABLE DOCUMENT. 310

GENERATE VECTOR EMBEDDINGS FOR THE DISCOVERABLE DOCUMENT AND STORE THE VECTOR EMBEDDINGS IN A VECTOR STORE 312

END

*FIG. 3*

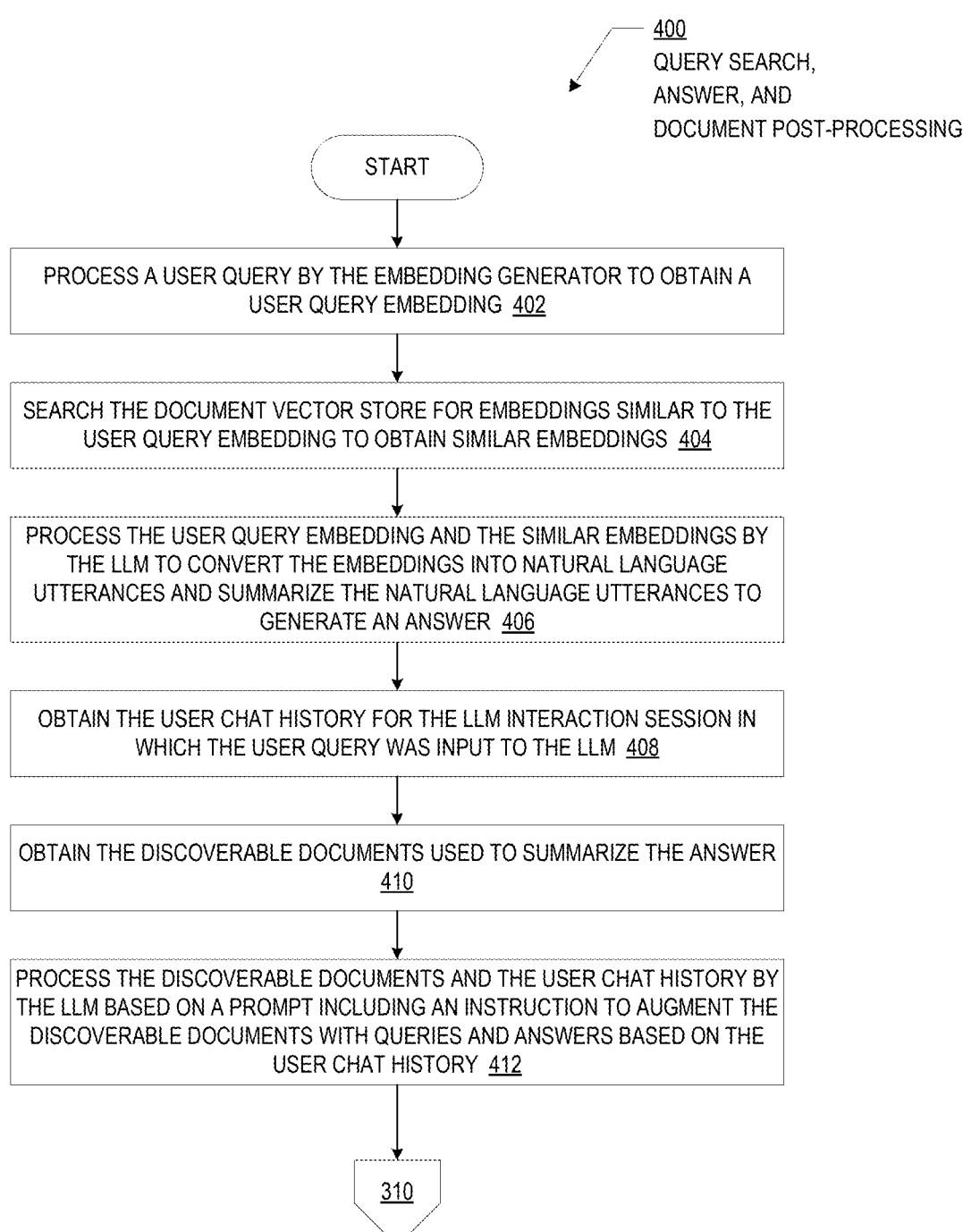

400
QUERY SEARCH,
ANSWER, AND
DOCUMENT POST-PROCESSING

START

PROCESS A USER QUERY BY THE EMBEDDING GENERATOR TO OBTAIN A USER QUERY EMBEDDING 402

SEARCH THE DOCUMENT VECTOR STORE FOR EMBEDDINGS SIMILAR TO THE USER QUERY EMBEDDING TO OBTAIN SIMILAR EMBEDDINGS 404

PROCESS THE USER QUERY EMBEDDING AND THE SIMILAR EMBEDDINGS BY THE LLM TO CONVERT THE EMBEDDINGS INTO NATURAL LANGUAGE UTTERANCES AND SUMMARIZE THE NATURAL LANGUAGE UTTERANCES TO GENERATE AN ANSWER 406

OBTAIN THE USER CHAT HISTORY FOR THE LLM INTERACTION SESSION IN WHICH THE USER QUERY WAS INPUT TO THE LLM 408

OBTAIN THE DISCOVERABLE DOCUMENTS USED TO SUMMARIZE THE ANSWER 410

PROCESS THE DISCOVERABLE DOCUMENTS AND THE USER CHAT HISTORY BY THE LLM BASED ON A PROMPT INCLUDING AN INSTRUCTION TO AUGMENT THE DISCOVERABLE DOCUMENTS WITH QUERIES AND ANSWERS BASED ON THE USER CHAT HISTORY 412

Figure 5:
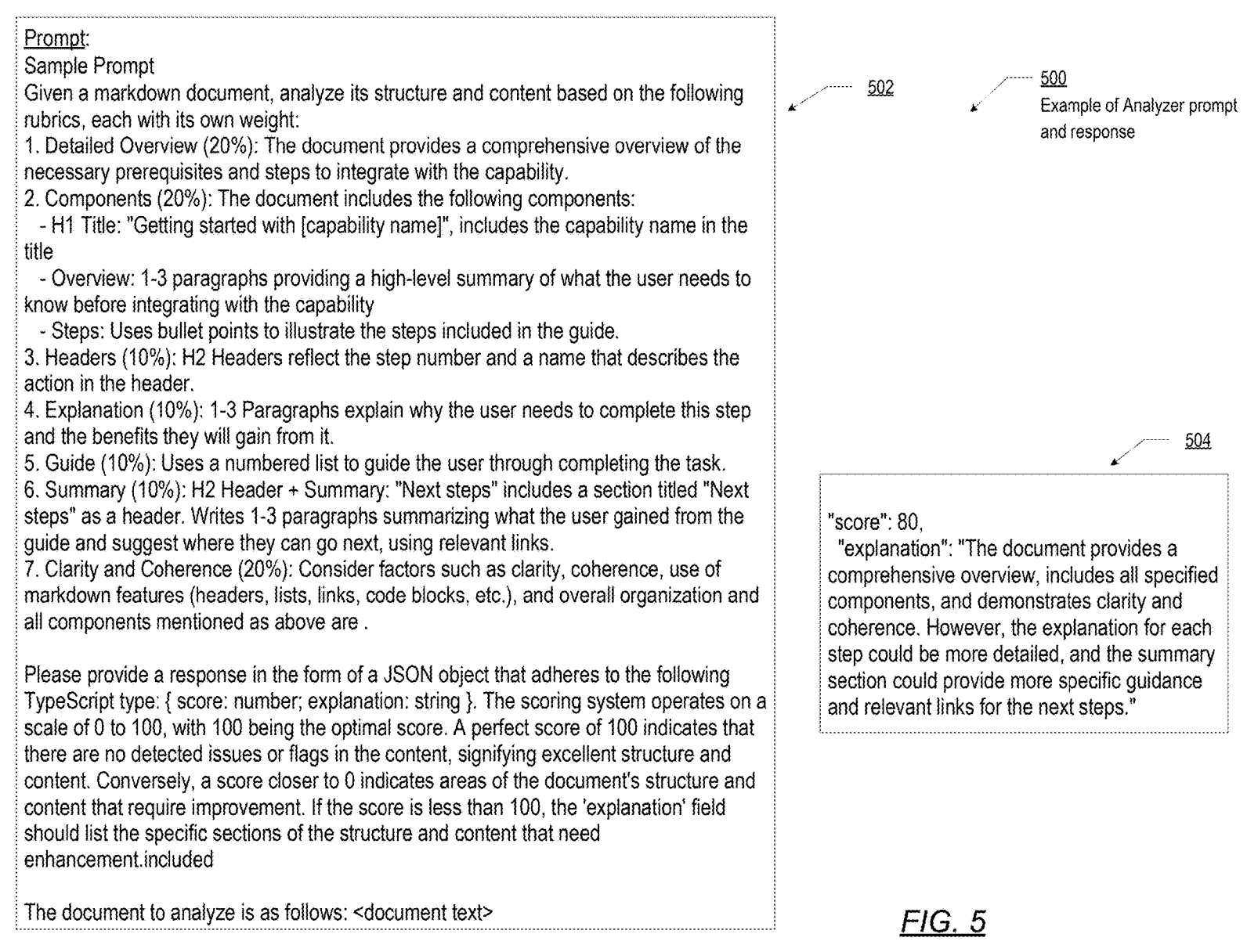

Example of Analyzer prompt and response

502

Prompt:
Sample Prompt
Given a markdown document, analyze its structure and content based on the following rubrics, each with its own weight:

1. Detailed Overview (20%): The document provides a comprehensive overview of the necessary prerequisites and steps to integrate with the capability.

2. Components (20%): The document includes the following components:
  - H1 Title: "Getting started with [capability name]", includes the capability name in the title

- Overview: 1-3 paragraphs providing a high-level summary of what the user needs to know before integrating with the capability

- Steps: Uses bullet points to illustrate the steps included in the guide.

3. Headers (10%): H2 Headers reflect the step number and a name that describes the action in the header.

4. Explanation (10%): 1-3 Paragraphs explain why the user needs to complete this step and the benefits they will gain from it.

5. Guide (10%): Uses a numbered list to guide the user through completing the task.

6. Summary (10%): H2 Header + Summary: "Next steps" includes a section titled "Next steps" as a header. Writes 1-3 paragraphs summarizing what the user gained from the guide and suggest where they can go next, using relevant links.

7. Clarity and Coherence (20%): Consider factors such as clarity, coherence, use of markdown features (headers, lists, links, code blocks, etc.), and overall organization and all components mentioned as above are .

Please provide a response in the form of a JSON object that adheres to the following TypeScript type: { score: number; explanation: string }. The scoring system operates on a scale of 0 to 100, with 100 being the optimal score. A perfect score of 100 indicates that there are no detected issues or flags in the content, signifying excellent structure and content. Conversely, a score closer to 0 indicates areas of the document's structure and content that require improvement. If the score is less than 100, the 'explanation' field should list the specific sections of the structure and content that need enhancement.included The document to analyze is as follows: <document text>

504

"score", 80,
"explanation". "The document provides a comprehensive overview, includes all specified components, and demonstrates clarity and coherence. However, the explanation for each step could be more detailed, and the summary section could provide more specific guidance and relevant links for the next steps."

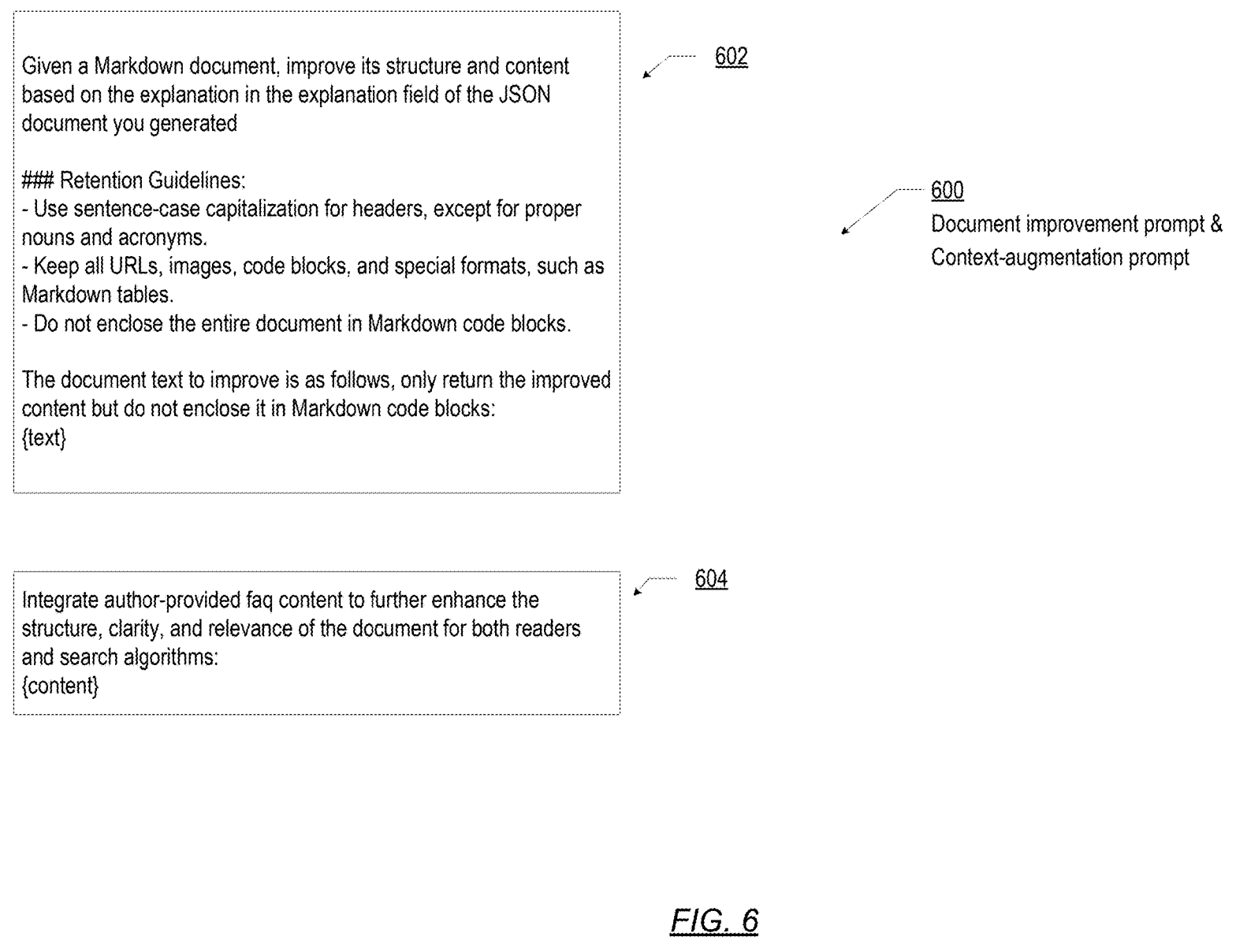

Document improvement prompt &
Context-augmentation prompt

602

Given a Markdown document, improve its structure and content based on the explanation in the explanation field of the JSON document you generated

Retention Guidelines:
- Use sentence-case capitalization for headers, except for proper nouns and acronyms.
- Keep all URLs, images, code blocks, and special formats, such as Markdown tables.
- Do not enclose the entire document in Markdown code blocks.

The document text to improve is as follows, only return the improved content but do not enclose it in Markdown code blocks:
{text}

604

Integrate author-provided faq content to further enhance the structure, clarity, and relevance of the document for both readers and search algorithms:
{content}

*FIG. 6*

700
COMPUTING
SYSTEM

712
OUTPUT DEVICE(S)

704
NON-PERSISTENT
STORAGE

702
COMPUTER
PROCESSOR(S)

706
PERSISTENT
STORAGE

708
COMMUNICATION
INTERFACE

710
INPUT DEVICE(S)

720
NETWORK

722
NODE X

724
NODE Y

726
CLIENT DEVICE

ACCELERATED KNOWLEDGE DISCOVERY FOR KNOWLEDGE BASE

BACKGROUND

Leveraging generative artificial intelligence (Generative AI) technology within an enterprise entails the deployment of large language models (LLMs) in the enterprise. A goal of using the LLMs is to comprehend and manage the semantic content of enterprise knowledge bases and document corpora within the enterprise. Commercially available LLMs are pre-trained on vast amounts of data and billions of parameters, resulting in advanced natural language processing (NLP) capabilities. The data used to train LLMs may be highly comprehendible and discoverable. The quality of the training data may maximize the advanced NLP capabilities of the LLM. Thus, pre-trained LLMs may comprehend and manage hitherto "unseen" enterprise knowledge bases and document corpora on account of being trained on high quality training data.

Within an enterprise, the effective discoverability of document corpora and enterprise knowledge bases in the context of commercially available, pre-trained LLMs finding information from these knowledge sources of the enterprise, refers to the ease and accuracy with which the LLMs can locate and retrieve information from these knowledge sources. However, the knowledge sources may include content with diverse inconsistencies in format, and structure. Further the content may be outdated, arcane, and have low comprehensibility. These aspects of content may cause the knowledge sources to have poor discoverability with respect to the LLMs. A technical challenge arises in ensuring the effective discoverability of document corpora and enterprise knowledge bases by the LLMs. The capability of the LLMs to manage the semantic content of the knowledge sources of an enterprise is conditional to the effective discoverability of the knowledge sources.

SUMMARY

In general, in one aspect, one or more embodiments relate to a method. The method includes iteratively executing a pre-processing document processing loop. The pre-processing document processing loop includes analyzing a raw document by a large language model (LLM). Further, the raw document is modified by the LLM based on a modification recommendation obtained from analyzing the raw document, to obtain an improved document. A document style rule set is further applied, by the LLM to the improved document to obtain a styled document. The styled document is further augmented with a semantic context by the LLM to obtain a discoverable document, until the discoverable document achieves a document readiness score greater than a document readiness threshold. The method further includes executing a post-processing document processing phase. The post-processing document processing phase includes obtaining a user query embedding of a user query in a user chat history. A discoverable document embedding corresponding to the discoverable document is obtained, in which the discoverable document embedding is semantically similar to the user query embedding. An answer to the user query is generated by the LLM from the discoverable document embedding. The discoverable document is further updated by executing the pre-processing document processing loop, with the semantic context including the user chat history.

In general, in one aspect, one or more embodiments relate to a system. The system includes at least one computer processor, a large language model (LLM), executing on the at least one computer processor, a document improvement engine including an analyzer, an improver, a standardizer, and a context updater and executing on the at least one computer processor. The document improvement engine is configured to iteratively execute a pre-processing document processing loop, including analyzing, by the analyzer, via the LLM, a raw document. The pre-processing document processing loop further includes modifying, by the improver, via the LLM, the raw document based on a modification recommendation obtained from analyzing the raw document to obtain an improved document. The pre-processing document processing loop further includes applying, by the standardizer, via the LLM, a document style rule set to the improved document to obtain a styled document. The pre-processing document processing loop further includes augmenting, by the context updater, via the LLM, the styled document with a semantic context to obtain a discoverable document, until the discoverable document achieves a document readiness score greater than a document readiness threshold. The system further includes a document discovery engine, including an embedding generator, a searcher, and an answer generator, and executing on the at least one computer processor, in which the document discovery engine is configured to execute a post-processing document processing phase including obtaining, from the embedding generator, a user query embedding of a user query in a user chat history. The post-processing document processing phase further includes obtaining, from the searcher, a discoverable document embedding corresponding to the discoverable document, in which the discoverable document embedding is semantically similar to the user query embedding. The post-processing document processing phase further includes generating an answer by the answer generator, via the LLM, to the user query from the discoverable document embedding. The post-processing document processing phase further includes updating the discoverable document by causing the document improvement engine to execute the pre-processing document processing loop, with the semantic context comprising the user chat history.

In general, in one aspect, one or more embodiments relate to a method. The method includes iteratively executing, by a document improvement engine including an analyzer, an improver, a standardizer, and a context updater, a pre-processing document processing loop, including obtaining, from a data repository, a raw document, and analyzing, by the analyzer, via a large language model (LLM), the raw document. The pre-processing document processing loop further includes modifying, by the improver, via the LLM, the raw document based on a modification recommendation obtained from analyzing the raw document to obtain an improved document. The pre-processing document processing loop further includes applying, by the standardizer, via the LLM, a document style rule set to the improved document to obtain a styled document. The pre-processing document processing loop further includes augmenting, by the context updater, via the LLM, the styled document with a semantic context to obtain a discoverable document, until the discoverable document achieves a document readiness score greater than a document readiness threshold. The method further includes executing, by a document discovery engine, including an embedding generator, a searcher and an answer generator, a post-processing document processing phase, including obtaining, from the embedding generator, a user query embedding of a user query in a user chat history from an AI assistant application. The post-processing document processing phase further includes obtaining, from the searcher, a discoverable document embedding corresponding to the discoverable document, in which the discoverable document embedding is semantically similar to the user query embedding. The post-processing document processing phase further includes generating, by the answer generator, an answer via the LLM, to the user query from the discoverable document embedding. The post-processing document processing phase further includes updating the discoverable document by causing the document improvement engine to execute the pre-processing document processing loop, with the semantic context comprising the user chat history.

Other aspects of one or more embodiments will be apparent from the following description and the appended claims.

BRIEF DESCRIPTION OF DRAWINGS

FIG. 2 shows a sequence diagram, in accordance with one or more embodiments.

FIG. 3 shows a flowchart of a method for document pre-processing and embedding, in accordance with one or more embodiments.

FIG. 4 shows a flowchart of a method for query search, answer, and document post-processing, in accordance with one or more embodiments.

FIG. 5 shows an example of an analyzer prompt and response, in accordance with one or more embodiments.

FIG. 6 shows an example of a document improvement prompt and a context-augmentation prompt, in accordance with one or more embodiments.

Like elements in the various figures are denoted by like reference numerals for consistency.

DETAILED DESCRIPTION

One or more embodiments are directed to a machine-driven analysis and improvement process of documents in an enterprise knowledge base with a goal of improving the effective discoverability of the documents by LLMs. The process may be characterized by the execution of two interconnected processing loops, or iterative processing sequences. An inner processing loop improves, or enhances, the content in the knowledge base. An outer processing loop creates vector embeddings for the improved, or enhanced, content and performs search and answer generation functionality for user queries based on the vector embeddings. The outer processing loop further encompasses a feedback step. In the feedback step, a user chat history is fed back to the inner processing loop. The user chat history is incorporated as updates to the discoverable documents used in the answer generation for a particular user query of the user chat history. Together, the inner and outer processing loops form an ongoing discoverability update and usability improvement process for the enterprise knowledge bases and document corpora of the enterprise. In other words, user chat histories may be used to inform and increase the usability and relevance of a document as a potential answer-generation source.

The inner processing loop includes prompt engineering to process a raw document by an LLM in an ordered sequence of prompts, also referred to as a "chain-of-thought" reasoning. The processing takes place in an ordered series of steps incorporating "few-shot prompting" techniques in which a small number of examples are provided within the prompts. The steps include document analysis based on a document rubric, and document modification based on the document analysis. The improved document further undergoes style modification for improved readability and augmentation with supplemental document context to obtain a discoverable document. A vector embedding is generated for the discoverable document. The outer processing loop includes prompt engineering to process a user query to generate an answer for the user query based on embedding similarity search with vector embeddings. The processing takes place in an ordered series of steps. The ordered series may include embedding generation of the user query, similarity search of the user query against discoverable document embeddings, conversion of the embeddings to natural language utterances and summary generation of the natural language utterances.

The feedback step of the outer loop entails leveraging the chat history corresponding to a particular user query to update the discoverable documents that were used in the answer generation corresponding to the particular user query. The user chat history is used in the augmentation step of the inner loop to update the discoverable documents.

Figure 1:
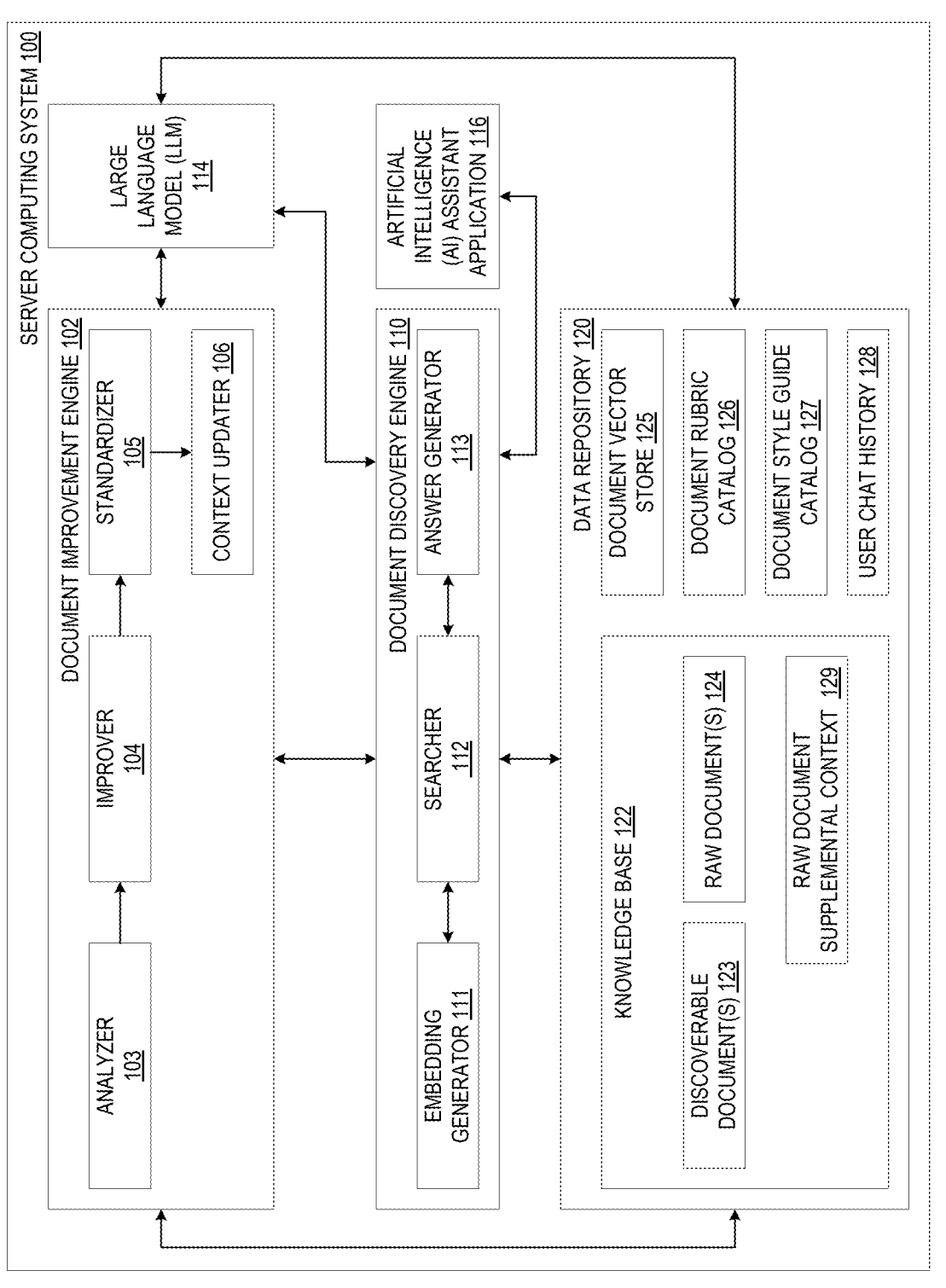
FIG. 1 shows a computing system, in accordance with one or more embodiments.

Attention is now turned to the figures. FIG. 1 is a system diagram of a server computing system (100), in accordance with one or more embodiments. The server computing system, also referred to as "the server," (100) is one or more computer processors, data repositories, communication devices, and supporting hardware and software. The server computing system (100) may be in a distributed computing environment. The server computing system (100) is configured to execute one or more applications, such as the document improvement engine (102), the document discovery engine (110), the large language model (LLM) (114), and an artificial intelligence (AI) assistant application (116). The server computing system (100) includes a computer processor. The computer processor is one or more hardware or virtual processors which may execute computer readable program code that defines the one or more applications, including the document improvement engine (102), the document discovery engine (110), the LLM (114), and the AI assistant application (116). An example of a computer system and network that may form the server computing system (100) is described with respect to FIG. 7A and FIG. 7B.

The server computing system shown in FIG. 1 includes a data repository (120). The data repository (120) is a type of storage unit or device (e.g., a file system, database, data structure, or any other storage mechanism) for storing data. The data repository (120) may include multiple different, potentially heterogeneous, storage units and/or physical storage devices.

As shown in FIG. 1, the data repository (120) includes a knowledge base (122), discoverable documents (123), raw documents (124), and raw document supplemental context (s) (129). The data repository (120) further includes a document vector store (125), a document rubric catalog (126), a document style guide catalog (127), and user chat history(ies) (128). Each of these components is described in detail herein.

Some terms as used in the current specification are described herein. The terms may be used in describing one or more aspects of the system shown in FIG. 1, the sequence diagram shown in FIG. 2, the methods shown in FIGS. 3 and 4, and the examples shown in FIGS. 5 and 6.

As used in the current specification, a discoverable document (123) refers to stored content capable of being found responsive to a query, even if not specified directly in the query. For example, a discoverable document may be easily accessible and found by users. While users may focus on locating known specific information, discoverability of documents in a knowledge base ensures that users can obtain relevant information beyond, and in addition to, the original search objective. In other words, discoverability facilitates access to previously unknown information to users, notably, information that users may not have been actively seeking. In contrast to a discoverable document, a raw document (124) is stored content generated through the operations of an enterprise. For example, the raw document (124) may be generated ad hoc without consideration of searchability. As an example, expense reports may be generated by employees of an enterprise. In another example, developer documentation of software code may be generated in the day-to-day process of code development by software developers in an enterprise. A raw document may undergo further processing to become discoverable.

In the context of evaluating a document for discoverability, a document rubric is a set of metrics that outlines specific criteria and standards to assess how easily a document can be found and accessed within an enterprise knowledge base. Using a document rubric in evaluating document discoverability standardizes the evaluation process, identifies areas for improvement, and ensures that the various documents comply with a consistent standard of discoverability. A document rubric may correspond to a particular document type. For example, a document rubric for source code documents may be different from a document rubric for expense reports of employees.

In the context of ensuring document readability, document style refers to the set of guidelines and conventions used to create consistent, clear, and user-friendly documents. Document style may encompass aspects of tone, voice, formatting, and structure of a document. In other words, document style may refer to guidelines for writing and formatting documents. Document style guides and/or criteria may facilitate ensuring that documents within an enterprise knowledge base are uniform and easy to read, enhancing document discoverability.

Referring again to the data repository (120), as shown in FIG. 1, the data repository includes a knowledge base (122). The knowledge base (122) is a centralized repository, storing and managing the collective knowledge of the enterprise. The knowledge base (122) may include diverse systems and documentation, for example, document sharing and versioning systems (e.g., GitHub), expense reports, benefits and payroll information, human resources policies, etc. The knowledge base (122) may be configured for centralized storage, search functionality, user access control. Further, the knowledge base may include collaboration tools and version control. Examples of enterprise knowledge base systems include Confluence®, SharePoint®, Notion®, Zendesk®, Guru®, etc.

As shown, the knowledge base (122) includes the discoverable document(s) (123) and the raw document(s) (124), as described above. The discoverable documents (123) are documents obtained from processing raw documents (124) through the inner processing loop of the machine-driven document analysis and improvement process. Thus, a discoverable document (123) may be an improved, standardized, augmented, and updated version of a raw document (124).

Additionally, the knowledge base (122) includes raw document supplemental context (129). Raw document supplemental context (129) refers to supplemental content corresponding to a particular raw document (124). The supplemental content may include, for example, at least a document summary, a usability summary (e.g., a "Quick Start" or "How-to" guide), a frequently asked question (FAQ) summary, etc. The supplemental context may be generated by knowledge base administrators, raw document authors, document discoverability developers, etc.

By way of example, a help manual relating to a database product offering may be created by one or more document writers of the enterprise. Over time, the document writers may develop supplemental content for the help manual. The supplemental content may summarize certain frequently used workflows in obtaining regular update reports from the database product offering, for example, a workflow for obtaining monthly expense insights. The workflow for obtaining monthly expense insights may be added to the knowledge base as a "How-to" guide. The "How-to" guide is a supplemental context for the raw document of the help manual.

The raw document supplemental context (129) corresponding to a raw document (124) may potentially be used to augment the raw document (124) in processing and updating the raw document to obtain a corresponding discoverable document (123). In one or more embodiments, the raw document supplemental context (129) may be stored as a supplemental document corresponding to the raw document in the knowledge base (122). In other words, a raw document may be associated with at least one raw document supplemental context document. The raw document supplemental context (129) is obtained from the knowledge base and used as a semantic context to be augmented into the (styled) document.

The data repository (120) further includes a document vector store (125). The document vector store (125) is a specialized database designed to store and manage vector representations of documents. The vectors are numerical representations of the documents' content. The vectors may be generated using machine learning models, for example, the embedding generator (111) shown in the system of FIG. 1. The document vector store (125) facilitates retrieval of documents based on a similarity of the corresponding document embeddings to a query vector, i.e., a vector representation of a natural language query. Examples of document vector stores include FAISS®, Pinecone®, and Weaviate®.

The data repository (120) further includes a document rubric catalog (126). The document rubric catalog (126) is a repository that is configured to store and manage document rubrics. A document rubric may correspond to a specific document type, and is a document in natural language in and of itself, including criteria for evaluating discoverability metrics of a specific document type. In one or more embodiments, the document rubric catalog (126) may include functionality for document rubric retrieval based on keyword search, document type, creation date, owner, etc. In one or more embodiments, the document rubric catalog (126) may be part of the knowledge base (122). In other embodiments, the document rubric catalog (126) may be a programmatically implemented custom data structure in the data repository (120).

The data repository (120) further includes a document style guide catalog (127). The document style guide catalog (127) is a centralized repository that is designed to store and manage document style guides. A document style guide may correspond to a specific document type, and is a document in natural language in and of itself, including guidelines for written style and format of a specific document type. In one or more embodiments, the document style guide catalog (127) may include functionality for document style retrieval based on keyword search, document type, creation date, owner, etc. In one or more embodiments, the document style guide catalog (127) may be part of the knowledge base (122). In other embodiments, the document style guide catalog (127) may be a programmatically implemented custom data structure in the data repository (120).

The data repository (120) further includes one or more user chat history(ies) (128). A user chat history (128) may be a transcript of a user chat session between a user and the AI assistant application (116), captured from the AI assistant application (116) executing on the server computing system (100). The user chat history (128) may include one or more user queries. The user chat history (128) may further include corresponding responses generated by the LLM (114) to the one or more user queries.

The server computing system (100) includes a LLM (114). The LLM (114) is a natural language processing machine learning model. An example of the LLM (114) may be a large language model, such as CHATGPT®. However, many different language models may be used. Use of the LLM (114) is described with respect to FIGS. 2, 3 and 4.

The server computing system (100) includes a document improvement engine (102). As shown in FIG. 1, the document improvement engine (102) is communicably and operably coupled to the LLM (114), the document discovery engine (110), and the data repository (120). The document improvement engine (102) includes an analyzer (103), an improver (104), a standardizer (105), and a context updater (106). The document improvement engine (102) is software or application specific hardware which, when executing on the server computing system (100), essentially performs the method of FIG. 3. Specifically, the document improvement engine (102), controls and coordinates operation of the analyzer (103), improver (104), standardizer (105), and context updater (106) to process raw documents (124) into discoverable documents (123). Each of the analyzer (103), improver (104), standardizer (105), and context updater (106) is software or application specific hardware, which, when executing on the server computing system (100) performs one of an ordered sequence of processing a raw document (124) into a discoverable document (123). Each of the analyzer (103), improver (104), standardizer (105), and context updater (106) is a component of the document improvement engine (102) shown in FIG. 1, that may be portable to, and re-usable in, other workflows related to document improvement and updates that may be implemented on the server computing system (100). In one or more embodiments, the analyzer (103), improver (104), standardizer (105), and context updater (106), dynamically generate specific prompts for the LLM (114), and programmatically invoke the LLM via respective embedded LLM agents in each of these components. The working of each of the analyzer (103), improver (104), standardizer (105), and context updater (106) is described in further detail in reference to FIG. 2.

The server computing system (100) includes a document discovery engine (110). As shown in FIG. 1, the document discovery engine (110) is communicably and operably coupled to the LLM (114), the document improvement engine (102), and the data repository (120). The document discovery engine (110) includes an embedding generator (111), a searcher (112), and an answer generator (113). The document improvement engine (102) is software or application specific hardware which, when executing on the server computing system (100), may perform the operations of FIG. 4. Specifically, the document discovery engine (110) may control and coordinate operation of the embedding generator (111), searcher (112), and the answer generator (113) to process user queries.

The operations of the embedding generator (111), searcher (112), and answer generator (113) include converting the user queries to user query embeddings, performing similarity searches to retrieve discoverable document embeddings semantically similar to the user query embedding, and processing the retrieved document embeddings to generate an answer to the user query. The embedding generator (111) may additionally be used to generate discoverable document embeddings from the discoverable documents. The discoverable document embeddings may further be stored in the document vector store (125). In a similar manner to the components of the document improvement engine (102), in one or more embodiments, the searcher (112), and answer generator (113) may dynamically generate specific prompts for the LLM (114), and programmatically invoke the LLM via respective embedded LLM agents in each of these components.

The embedding generator (111) is an embedding machine learning model that is trained to convert natural language text into a vector data structure composed of features and values. An example of the vector generation controller (132) may be an ADA-002 machine learning model. However, many different embedding models may be used. The working of each of the embedding generator (111), searcher (112), and answer generator (113), is described in further detail in reference to FIG. 2.

The server computing system (100) further includes the AI assistant application (116). The AI assistant application (116) is software or specific hardware, which, when executed by the server computing system (100), understands, and responds in natural language to user queries in natural language. Further, the AI assistant application (116) may automate certain workflows, for example, calendar scheduling, email management, and learn from user interactions to provide personalized recommendations and responses. Examples of AI assistant applications include Bing Co-pilot®, Google Assistant®, Amazon Alexa®, Apple Siri®, etc. In one or more embodiments, the AI assistant application (116) may serve client application stubs operating on one or more user computing systems which may be remote from the server computing system (100).

While FIG. 1 shows a configuration of components, other configurations may be used without departing from the scope of one or more embodiments. For example, various components may be combined to create a single component. As another example, the functionality performed by a single component may be performed by two or more components.

FIG. 2 shows a sequence diagram of the inner processing loop and the outer processing loop and the interconnection between the processing loops, in accordance with one or more embodiments. In FIG. 2, the processing loops are depicted as two interconnected loops. The inner processing loop (210) depicts the process of improving the documents. In the inner processing loop (210), raw documents may be analyzed, modified, and augmented to obtain discoverable documents. The discoverable documents are searchable, while maintaining similarity to the raw documents. In one or more embodiments, the inner processing loop (210) may be coordinated and orchestrated by the document improvement engine (102) of the system shown in FIG. 1.

The LLM (214) is depicted at the center of the inner processing loop (210) and the outer processing loop (220). The LLM (214) of FIG. 2 corresponds to the LLM (114) of FIG. 1.

The inner processing loop may have an entry point as shown in FIG. 2, in which an input (raw) document is obtained by the document improvement engine of FIG. 1, and passed to the analyzer (203). The analyzer (203) of FIG. 2 corresponds to the analyzer (103) of FIG. 1. The analyzer (203) evaluates the document's structure and comprehension using a document rubric specific to the type of document. More specifically, the analyzer (203) generates a prompt. The prompt includes an instruction to evaluate the raw document in accordance with a document rubric selected from the document rubric catalog. The prompt, raw document, and document rubric are processed by the LLM (214). The LLM (214) generates a document readiness score as a result of the evaluation.

In response to the document readiness score being above a document readiness threshold, i.e., a satisfactory score being obtained by the raw document being evaluated, the inner processing loop ends for the raw document. An embedding is created for the raw document in the document vector store by the embedding generator (211), rendering the raw document searchable by embedding, or vector, search.

In response to the document readiness score falling below a document readiness threshold, the analyzer (203) generates a prompt including an instruction to generate modification recommendations, based on the evaluation of the previous step and the document readiness score. The prompt is processed by the LLM (214), and the LLM (214) generates modification recommendations. The modification recommendations may be suggestions in natural language utterances to modify the document in a particular manner. The modification recommendations may encompass changes to the document's structure and comprehensibility. These recommendations are then passed to the improver (204).

The improver (204) of FIG. 2 corresponds to the improver (104) of FIG. 1. The improver (204) generates dynamic prompts based on the modification recommendations from the analyzer (203). The dynamic prompt(s), the raw document and the modification recommendations are processed by the LLM (214). The LLM (214) generates an improved document as a response. The improved document is a modified version of the raw document, modified in accordance with the modification recommendations. The improved document is then passed to the standardizer (205).

The standardizer (205) of FIG. 2 corresponds to the standardizer (105) of FIG. 1. The standardizer (205) generates a prompt for the LLM including an instruction to apply a specific writing style to the improved document. The standardizer-generated prompt, the improved document, and a document style guide, selected from the document style guide catalog are processed by the LLM. The document style guide may include a document style rule set. The LLM modifies the improved document in accordance with the document style rule set and returns the styled document to the standardizer (205). The styled document is a corrected version of the improved document, for example, including corrections to spelling, grammar, punctuation, tone, sensitive language, and adherence to formatting and other style guidelines. The styled document is then passed to the context updater (206).

The context updater (206) augments the styled document with enhancements for semantic and keyword search, resulting in a discoverable document. The context updater (206) may add semantic context, such as frequently asked questions, frequently requested workflows, etc., under specific titles and headers. In one or more embodiments, the context updater (206), may identify raw document supplemental context corresponding to the styled document. The raw document supplemental context serves as the semantic context to be augmented to the styled document. The context updater (206) may further access other knowledge sources within the enterprise to augment and update the discoverable document with fresh information. Thus, the discoverable document is an augmented and updated version of the styled document, including, for example, one or more additional section headings and corresponding content obtained from the raw document supplemental context. The discoverable document may further include content which is an updated version of the original content of the styled document. For example, if the tax calculation for a previous financial year is explained in the styled document, then the discoverable document may include the tax calculation for the current financial year.

The discoverable document is then passed to the embedding generator (211), shown in the outer processing loop (220). The embedding generator (211) creates vector representations of the document. The vector representations of the discoverable document may be used in clustering and similarity searches. The discoverable document passed to the embedding generator (211) may mark an exit point of the inner processing loop with respect to the discoverable document. In other words, processing of the particular discoverable document may be considered to be complete, and the inner processing loop may continue to the next available raw document.

The outer processing loop (220) entails tasks that make documents accessible for answering user queries, such as creating embeddings, search functionality, and answer generation functionality. An input to the outer processing loop (220), may be a user query input to the searcher (212), as shown in FIG. 2. In one or more embodiments, the user query may be obtained from the AI assistant application (116) of FIG. 1. The searcher (212) of FIG. 2 corresponds to the searcher (112) of FIG. 1. In one or more embodiments, the outer processing loop (220) may be coordinated and orchestrated by the document discovery engine (110) of the system shown in FIG. 1.

The searcher (212) in the outer processing loop (220) receives the user query and may pass the user query to the embedding generator (211) to generate a user query embedding corresponding to the user query. The searcher (212) may receive the user query embedding from the embedding generator (211). Further, the searcher (212) may search the document vector store shown in FIG. 1, for relevant documents, or relevant text chunks of relevant documents, based on semantic similarity to the user query. The search results and the user query embedding are then passed to the answer generator (213).

The answer generator (213) of FIG. 2 corresponds to the answer generator (113) of FIG. 1. The answer generator (213) receives the user query embedding and the search results, which may be in the form of embeddings, from the searcher (212). The answer generator (213) generates a prompt, including an instruction to convert the search result embeddings into natural language utterances and generate a natural language answer to the user query. The prompt is processed by the LLM (214), and the response is returned to the user.

In the feedback step that interconnects the inner processing loop and the outer processing loop, the user chat history of the current interaction session between the user and the AI assistant application may be sent to the context updater (206). The context updater (206) may additionally receive discoverable document identifier(s). The identifiers may correspond to the discoverable document(s) that may have been used in the answer generation for the user query. The discoverable documents may be updated by the context updater (206) with information obtained from the user chat history. The discoverable documents may be re-processed through the inner processing loop to ensure adherence to corresponding document rubrics and document style guides. Further, updated document embeddings may be generated for the updated discoverable documents. Thus, the inner and outer processing loops together form a continuous cycle of improvement and usage.

FIG. 3 shows a flowchart 300 of a method for document pre-processing and embedding, in accordance with one or more embodiments. The method of FIG. 3 may be implemented using the system of FIG. 1 and one or more of the steps may be performed on or received at one or more computer processors. While the various steps in the flowchart 300 are presented and described sequentially, the steps may be performed actively or passively.

The flowchart 300 starts at Block 302. In Block 302, a raw document is obtained from the knowledge base. In one or more embodiments, the document improvement engine may obtain the raw document from the knowledge base in the data repository. Further, the document improvement engine may be executing as a background process, orchestrating one or more instances of each of the analyzer, improver, standardizer, and context updater. Alternative execution models and configurations may be possible.

In Block 304, the raw document is evaluated against a document rubric corresponding to the document to obtain a document readiness score. Further, improvement recommendations for the raw document may be generated based on the document readiness score. In one or more embodiments, the LLM may analyze the raw document. More particularly, the LLM may evaluate the raw document based on a document rubric. The LLM may be invoked by the analyzer via an LLM agent. An LLM agent is a software component that leverages an LLM as its central computational engine. In one or more embodiments, the LLM agent may be integrated with the analyzer. In other embodiments, the analyzer may invoke an independently executing LLM agent process on the server computational system. Other architectural arrangements and execution models may be possible.

In one or more embodiments, the analyzer may obtain the document rubric from the document rubric catalog in the data repository. The document rubric may be a natural language document, including descriptions and ratings of rubric parameters. The document rubric may include diverse factors to be evaluated that contribute to the overall discoverability of the document. For example, metadata quality may evaluate the completeness, readability, and accuracy of document metadata such as titles, tags, keywords, and descriptions. Further, content relevance of a document may be assessed to ascertain whether the document content is relevant to the intended audience and purpose. Notably, the update frequency of a document may be a criterion to ensure the currentness and usefulness of a document. Furthermore, evaluating search optimization readiness may check if the document is optimized for search engines within the knowledge base, including the use of appropriate keywords and phrases. Linking and references to and within a document may be evaluated to determine how the document is linked to other relevant documents and resources within the knowledge base. Additionally, a measure of user engagement may be taken, measuring how often the document is accessed, read, and interacted with by users. A document rubric may further include navigation and accessibility evaluation criteria to ensure that a document is easy to navigate and accessible to all users, including those with disabilities.

Accordingly, the analyzer may generate a document-analysis prompt for the LLM, including an instruction to evaluate the raw document based on the document rubric. Further, the analyzer may send the document-analysis prompt, the raw document, and the document rubric to the LLM. The LLM may process the document-analysis prompt, the raw document, and the document rubric, to generate the document readiness score corresponding to the raw document.

In Block 306, prompts are generated based on the improvement recommendations. The generated prompts and the document are processed by the large language model (LLM) to obtain an improved document. In one or more embodiments, the step of Block 306 may entail modifying the raw document by the LLM, based on modification, or improvement, recommendations obtained from analyzing the raw document by the analyzer, to obtain an improved document. In one or more embodiments, a modification recommendation prompt to the LLM may be generated by the improver, in response to the document readiness score generated by the analyzer being less than a document readiness threshold. The modification recommendation prompt may include an instruction to generate a modification recommendation based on evaluating the raw document. The modification recommendation prompt may be processed by the LLM to obtain the modification recommendation. In one or more embodiments, the modification recommendation may include LLM-generated instructions on what to modify in the raw document. Further, the modification recommendation may further include LLM-generated instructions on how to modify the raw document.

Subsequent to receiving the modification recommendation from the LLM, the improver may further generate an improvement prompt to the LLM. The improvement prompt may include an instruction to modify the raw document based on the modification recommendation. In one or more embodiments, the improver may invoke the LLM via an LLM agent, in a similar manner to the analyzer. Furthermore, the improvement prompt, the raw document, and the modification recommendation may be processed by the LLM to generate an improved document. Further, the improved document may be obtained from the LLM.

In one or more embodiments, the improved document may be compared to the raw document, with a goal of ascertaining that the content and intent of the raw document are maintained in the improved document. The improved document may be compared with the raw document to determine a semantic similarity of the improved document with respect to the raw document. In this case, semantic similarity refers to the similarity in meaning and intent between the improved document and the raw document. In one or more embodiments, the semantic similarity may be estimated by a vector embedding similarity between the improved document embedding(s) and the raw document embedding(s). In one or more embodiments, a cosine distance function of the improved document embedding(s) with respect to the raw document embedding(s) may be evaluated. As a general overview, cosine similarity measures the cosine of the angle between two non-zero vectors in a multi-dimensional space. Cosine similarity may be used to determine how similar two vectors are, regardless of their magnitude. The value ranges from −1 to 1, where 1 means the vectors are identical, 0 means they are orthogonal (no similarity), and −1 means they are diametrically opposed.

Other methods for determining semantic similarity may be used, for example, Euclidean distance, Manhattan distance, Dot product, etc.

Accordingly, a similarity score corresponding to a semantic similarity of the improved document with respect to the raw document may be obtained. The improved document may be retained in response to the similarity score being greater than a similarity threshold. On the other hand, in response to the similarity score being less than the similarity threshold, the improved document may be discarded.

In one or more embodiments, if the improved document is discarded, the inner processing loop may be re-iterated for the particular raw document. In this scenario, the document rubric may be modified. In other embodiments, the analyzer may generate a prompt to the LLM including an instruction to evaluate the raw document on a first subset of parameters of the document rubric and exclude a second subset of parameters of the document rubric. The instruction may further direct the LLM to generate an improvement recommendation different from the previous improvement recommendation. Other alternative prompts may be generated.

In Block 308, prompts to apply a writing style corresponding to the improved document are generated. The prompts and improved document are processed by the LLM to obtain a styled document. In one or more embodiments, the step of Block 308 may entail applying a document style rule set to the improved document by the LLM to obtain a styled document. More particularly, the standardizer of FIG. 1 may generate a style-modification prompt to the LLM. The style-modification prompt may include an instruction to modify the improved document based on the document style rule set.

In one or more embodiments, the standardizer may obtain the document style rule set from a document style guide. The document style guide may be obtained from the document style guide catalog. The document style guide may be a document in and of itself. The document style guide may include a document style rule set corresponding to the particular raw document.

In one or more embodiments, the document style rule set may be a set of rules written in natural language. In certain other embodiments, the document style rule set may include a set of style fields and values (e.g., Font: Times New Roman; Paragraph: Justified; etc.). Further, the document style rule set may include rules pertaining to certain aspects of document style. For example, the document style rule set may include consistent formatting rules, e.g., using uniform headings, fonts, and spacing. Other rules may include allowed jargon-free and lucid vocabulary. Additional rules may include standardized sections requirements, such as summaries, introductions, and conclusions. Furthermore, document style rule sets may include formatting and layout rules for visual elements of document style, e.g., proper use of images, tables, and bullet points to break up text and highlight information.

Accordingly, the style-modification prompt, the document style rule set, and the improved document may be processed by the LLM to generate the styled document. Further, the styled document may be obtained from the LLM.

In Block 310, prompts to the LLM are generated, based on the styled document and a semantic context. The prompts may be processed by the LLM to augment the styled document content with section headings based on the semantic context. A discoverable document may be obtained as a result. In one or more embodiments, the step of Block 310 entails augmenting, by the LLM, the styled document with a semantic context to obtain a discoverable document.

In one or more embodiments, a raw document supplemental context corresponding to the raw document may be obtained from the raw document supplemental context in the data repository. The semantic context may include the raw document supplemental context. Further, a context-augmentation prompt to the LLM may be generated by the context updater. The context-augmentation prompt may include an instruction to augment the styled document with at least one section heading corresponding to the semantic context, and content corresponding to the semantic context. The context-augmentation prompt, the semantic context, and the styled document may be processed by the LLM to generate the discoverable document. Further, the discoverable document may be obtained from the LLM.

In Block 312, vector embeddings are generated for the discoverable document. Further, the vector embeddings may be stored in a vector store. In one or more embodiments, the embedding generator may generate the discoverable document vector embedding. Further, the discoverable document vector embedding may be stored in the document vector store. In one or more embodiments, the step(s) of Block 312 may be performed responsive to the discoverable document having the document readiness score greater than the document readiness threshold. More particularly, the discoverable document may be evaluated in accordance with the step(s) of Block 302, and the document readiness score determined accordingly. Further, the document readiness score may be compared with the document readiness threshold to determine whether the document readiness score is greater than the document readiness threshold.

Thus, Blocks 302-310 of flowchart 300 may be performed iteratively for a particular raw document. The iterations may be halted when the stopping condition of the document readiness score being greater than the document readiness threshold is satisfied. In other embodiments, Blocks 302-310 flowchart 300 may be iterated for a fixed number of iterations. If, within the fixed number of iterations, a discoverable document satisfying the document readiness threshold is obtained, then the step of Block 312 may be performed for the discoverable document. On the other hand, if a discoverable document satisfying the document readiness threshold is not obtainable within the fixed number of iterations, the discoverable document may be discarded. The flowchart 300 ends at Block 312.

FIG. 4 shows a flowchart 400 of a method for query search, answer, and document post-processing, in accordance with one or more embodiments. The method of FIG. 4 may be implemented using the system of FIG. 1 and one or more of the steps may be performed on or received at one or more computer processors. While the various steps in the flowchart 400 are presented and described sequentially, at least some of the steps may be executed in different orders, may be combined, or omitted, and at least some of the steps may be executed in parallel. Furthermore, the steps may be performed actively or passively.

The flowchart 400 starts at Block 402. In Block 402, a user query may be processed by the embedding generator to obtain a user query embedding. In one or more embodiments, a user query embedding of a user query may be obtained from a user chat history. A user may access the AI assistant application and initiate a user chat session. The user chat history may correspond to the user chat session. Accordingly, the user query may be a query entered by the user in one or more natural language utterances. In one or more embodiments, the searcher of the document discovery engine may obtain the user query from the user chat session, and invoke the embedding generator to generate the user query embedding corresponding to the user query.

In Block 404, the document vector store is searched for embeddings similar to the user query embedding. One or more similar embeddings may be obtained as a result of the search. In one or more embodiments, the similar embeddings may be discoverable document embeddings. The discoverable document embeddings may be obtained by the searcher from the document vector store. The discoverable document embeddings may correspond to discoverable documents that are semantically similar to the user query embedding. In this case, semantic similarity refers to the similarity in meaning of a user query and a discoverable document. Semantic similarity may be estimated by a vector embedding similarity between the discoverable document embedding(s) and the user query embedding. In one or more embodiments, semantic similarity between the discoverable documents and the user query may be determined by evaluating a cosine distance function of the user query embedding with respect to the discoverable document embedding(s). Other methods for determining semantic similarity may be used, for example, Euclidean distance, Manhattan distance, Dot product, etc. Accordingly, the discoverable document embeddings having cosine distance function values above a similarity threshold with respect to the user query embedding may be selected as the similar embeddings.

In Block 406, the user query embedding, and the similar embeddings are processed by the LLM. More particularly, the user query embedding, and the similar embeddings are converted by the LLM into natural language utterances. Further, the LLM may summarize the natural language utterances to generate an answer to the user query. In one or more embodiments, the similar embeddings are discoverable document embeddings. Accordingly, an answer may be generated by the LLM to the user query from the discoverable document embedding(s). Specifically, an answer-generation prompt may be generated for the LLM, by the answer generator. The answer-generation prompt may include an instruction to convert the user query embedding and the discoverable document embedding(s) into corresponding natural language utterances. Further, the answer-generation prompt, the user query embedding and the discoverable document embedding(s) may be processed by the LLM to obtain the corresponding natural language utterances. Additionally, the answer generator may generate a summarization prompt for the LLM. The summarization prompt may include an instruction to summarize the corresponding natural language utterances into the answer. Furthermore, the summarization prompt and the corresponding natural language utterances may be processed by the LLM to generate the answer. The answer may be obtained from the LLM by the answer generator.

In Block 408, the user chat history for the LLM interaction session in which the user query was input to the LLM is obtained. In one or more embodiments, the answer generator may obtain the user chat history from the AI assistant application. In Block 410, the discoverable documents used to summarize the answer are obtained. In one or more embodiments, the answer generator may obtain discoverable document identifiers corresponding to the discoverable documents that were used by the LLM to generate the answer to the user query, in Block 406. A goal of obtaining the discoverable documents used to generate the answer may be to potentially update the discoverable documents with useful information from the current user chat history.

Block 412 of the flowchart 400 entails a feedback step from the post-processing document processing phase of the flowchart 400 to the pre-processing document processing loop of the flowchart 300. In particular, Block 412 of the flowchart 400 may trigger the execution of the flowchart 300, particularly, the step of Block 310. Accordingly, in one or more embodiments, the document discovery engine orchestrating the operation of the embedding generator, the answer generator, and the searcher may invoke the document improvement engine with the user chat history and the discoverable documents obtained in Blocks 408 and 410, respectively.

In one or more embodiments, a pattern of user queries and responses may be identified from the user chat history. The pattern of user queries and responses in the user chat history may be analyzed by the document improvement engine. The analysis of the pattern of user queries and responses may cause the document improvement engine to generate additional semantic context corresponding to one or more discoverable documents that may have been used in response generation in the particular user chat history.

For example, several users may have common queries regarding usage of a particular feature of a tax preparation product offering of the enterprise. In analyzing the user chat histories related to the tax preparation product offering, additional semantic context may be synthesized by the document improvement engine via the LLM, pertaining to a workflow for usage of the particular feature. This workflow may be augmented to one or more discoverable documents used in generating the responses pertaining to the workflow by updates to the discoverable documents. The updates may occur in the feedback step from the document post-processing phase to the document pre-processing loop. For example, the workflow may be added under a separate section heading, indicating the particular feature in the one or more discoverable documents. In future searches, the separate section heading may facilitate efficient retrieval of the particular workflow from the updated discoverable documents, as a pre-defined, or pre-packaged answer, to similar user queries regarding usage of the particular feature.

Accordingly, in Block 412, the discoverable documents and the user chat history are processed by the LLM based on a prompt including an instruction to augment the discoverable documents with queries and answers based on the user chat history. In one or more embodiments, Block 412 feeds back into Block 310 of the flowchart 300. More particularly, the discoverable document(s) may be updated by executing the pre-processing document processing loop. The context updater may update the discoverable documents with the semantic context. The semantic context, in this case, may include the user chat history.

In one or more embodiments, the updated discoverable documents may be iterated through the remaining steps of the flowchart 300. For example, subsequent to the update of a discoverable document with the semantic context including the user char history, the discoverable document may undergo the step of Block 302. That is, the discoverable document may be re-evaluated and given a document readiness score by the analyzer working in conjunction with the LLM. Further, responsive to the document readiness score not being above the document readiness threshold, the discoverable document may re-undergo steps 304-310 of the flowchart 300, until the document readiness score is above the document readiness threshold. Furthermore, a new vector embedding for the updated discoverable document may be generated by the embedding generator and added to the document vector store, subject to the document readiness score satisfying the document readiness threshold.

FIG. 5 shows an example of an analyzer prompt and response, in accordance with one or more embodiments. The following example is for explanatory purposes only and not intended to limit the scope of one or more embodiments.

Block 502 shows an example of a prompt generated by the analyzer, in the document pre-processing loop. The prompt includes the document rubric content, with weights for each rubric metric contributing to the overall document readiness score. In this example, seven metrics are described in the document rubric, and the corresponding weightage to be given to each metric in determining the document readiness score. The response is requested in the form of a Javascript Object Notation (JSON) object. The raw document is provided in the placeholder specifying <document text>.

Block 504 shows an example of the response generated by the LLM as an answer to the prompt of Block 502. The document readiness score is 80. The document readiness score is deemed less than the threshold (in the example, showing as 100). An explanation is provided regarding the metrics in which the document conforms well to the rubric requirements, and other metrics in which the document requires improvement.

The response of Block 504 may potentially be used by the improver to generate an additional prompt.

FIG. 6 shows an example of a document improvement prompt and a context-augmentation prompts, in accordance with one or more embodiments. The following example is for explanatory purposes only and not intended to limit the scope of one or more embodiments.

Block 602 shows the document improvement prompt, including an instruction to the LLM to improve the structure and content of the markdown document undergoing the document pre-processing process. The prompt directs the LLM to use the explanation generated by the LLM in a previous document analysis step (for example, the explanation generated shown in Block 504 of FIG. 5). Block 602 further includes a style guide. As shown in the example, the document improvement aspect of the prompt and the style improvement aspect of the prompt are combined into a single prompt. However, the prompt may be divided into a document improvement prompt and a style modification prompt, in accordance with the method shown in FIG. 3. As shown in Block 602, the style guide may include rules on preserving hypertext links, images, and presentation fonts for headers, etc. The markdown document may further undergo a similarity check between the improved content and the original content, as described in reference to Block 306.

Block 604 shows an example of a context-augmentation prompt, in accordance with the method shown in FIG. 3. The "<content>" provided may include author-generated FAQ content.

In response to the prompts shown in FIG. 6, the LLM may generate progressively modified versions of the markdown document undergoing document pre-processing.

Figure 7A:
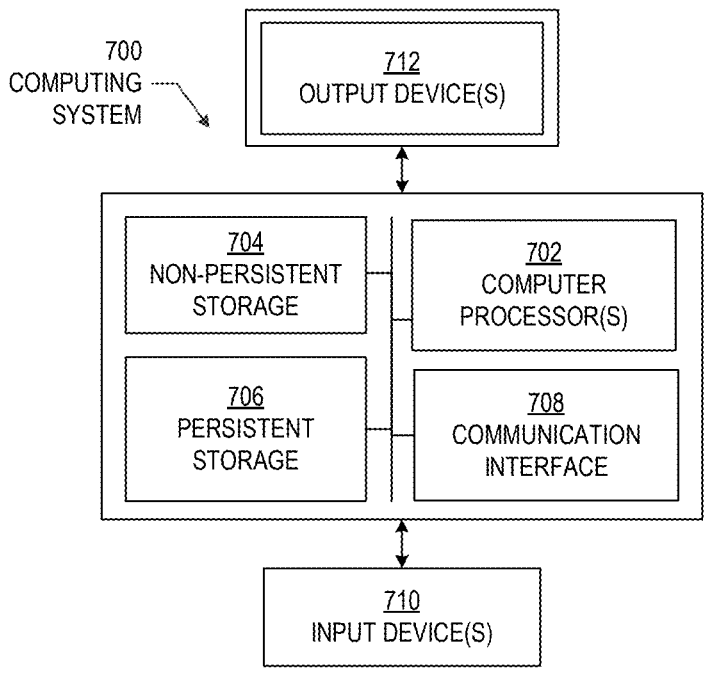
FIG. 7A and FIG. 7B show a computing system, in accordance with one or more embodiments.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 7A, the computing system (700) may include one or more computer processor(s) (702), non-persistent storage device(s) (704), persistent storage device(s) (706), a communication interface (708) (e.g., Bluetooth interface, infrared interface, network interface, optical interface, etc.), and numerous other elements and functionalities that implement the features and elements of the disclosure. The computer processor(s) (702) may be an integrated circuit for processing instructions. The computer processor(s) (702) may be one or more cores, or micro-cores, of a processor. The computer processor(s) (702) includes one or more processors. The computer processor(s) (702) may include a central processing unit (CPU), a graphics processing unit (GPU), a tensor processing unit (TPU), combinations thereof, etc.

The input device(s) (710) may include a touchscreen, keyboard, mouse, microphone, touchpad, electronic pen, or any other type of input device. The input device(s) (710) may receive inputs from a user that are responsive to data and messages presented by the output device(s) (712). The inputs may include text input, audio input, video input, etc., which may be processed and transmitted by the computing system (700) in accordance with one or more embodiments. The communication interface (708) may include an integrated circuit for connecting the computing system (700) to a network (not shown) (e.g., a local area network (LAN), a wide area network (WAN) such as the Internet, mobile network, or any other type of network) or to another device, such as another computing device, and combinations thereof.

Further, the output device(s) (712) may include a display device, a printer, external storage, or any other output device. One or more of the output device(s) (712) may be the same or different from the input device(s) (710). The input device(s) (710) and output device(s) (712) may be locally or remotely connected to the computer processor(s) (702). Many different types of computing systems exist, and the aforementioned input device(s) (710) and output device(s) (712) may take other forms. The output device(s) (712) may display data and messages that are transmitted and received by the computing system (700). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (702), is configured to perform one or more embodiments, which may include transmitting, receiving, presenting, and displaying data and messages described in the other figures of the disclosure.

Figure 7B:
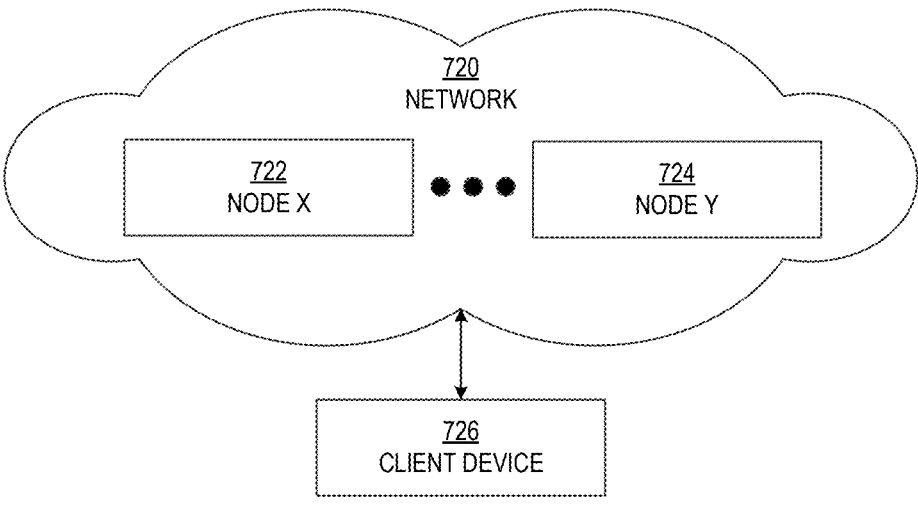

The computing system (700) in FIG. 7A may be connected to, or be a part of, a network. For example, as shown in FIG. 7B, the network (720) may include multiple nodes (e.g., node X (722) and node Y (724), as well as extant intervening nodes between node X (722) and node Y (724)). Each node may correspond to a computing system, such as the computing system shown in FIG. 7A, or a group of nodes combined may correspond to the computing system shown in FIG. 7A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (700) may be located at a remote location and connected to the other elements over a network.

The nodes (e.g., node X (722) and node Y (724)) in the network (720) may be configured to provide services for a client device (726). The services may include receiving requests and transmitting responses to the client device (726). For example, the nodes may be part of a cloud computing system. The client device (726) may be a computing system, such as the computing system shown in FIG. 7A. Further, the client device (726) may include or perform all or a portion of one or more embodiments.

The computing system of FIG. 7A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
    iteratively executing a pre-processing document processing loop, comprising:
        analyzing, by a large language model (LLM), a raw document based on a raw document type of the raw document, to obtain a document readiness score of the raw document,
        responsive to the document readiness score being less than a document readiness threshold, performing operations comprising:
            generating a modification recommendation prompt to the LLM including an instruction to generate a modification recommendation based on evaluating the raw document against a document rubric of the raw document type,
        processing the modification recommendation prompt by the LLM to obtain the modification recommendation,
        modifying, by the LLM, the raw document in accordance with the modification recommendation obtained from analyzing the raw document to obtain a modified document,
        applying, by the LLM, a document style rule set to the modified document to obtain a styled document when the modified document satisfies a similarity threshold with respect to the raw document,
        augmenting, by the LLM, the styled document with a semantic context to obtain a discoverable document, and
        generating by the LLM, a second document readiness score corresponding to the discoverable document,
    until the second document readiness score is greater than the document readiness threshold; and
    executing a post-processing document processing phase, comprising:
        obtaining a user query embedding of a user query in a user chat history,
        obtaining a discoverable document embedding corresponding to the discoverable document, wherein the discoverable document embedding is semantically similar to the user query embedding,
        generating an answer, by the LLM, to the user query from the discoverable document embedding, and
        triggering the execution of the pre-processing document processing loop to perform updating the discoverable document with the semantic context, wherein the semantic context comprises the user chat history.

2. The method of claim 1, wherein analyzing the raw document further comprises:
    evaluating the raw document based on the document rubric of the raw document type by:
        generating a document-analysis prompt for the LLM, including an instruction to evaluate the raw document based on the document rubric,
        sending the document-analysis prompt, the raw document, and the document rubric to the LLM, and
        processing, by the LLM, the document-analysis prompt, the raw document, and the document rubric, to generate the document readiness score corresponding to the raw document.

3. The method of claim 1, wherein modifying the raw document by the LLM further comprises:

generating a prompt to the LLM including an instruction to modify the raw document based on the modification recommendation, and processing the prompt, the raw document, and the modification recommendation by the LLM to obtain the modified document.

4. The method of claim 1, further comprising:

responsive to a similarity score being less than the similarity threshold, discarding the modified document.

5. The method of claim 1, wherein obtaining a styled document further comprises:

generating, a style-modification prompt to the LLM including an instruction to modify the modified document based on the document style rule set, and processing the style-modification prompt, the document style rule set, and the modified document by the LLM to obtain the styled document.

6. The method of claim 1, wherein augmenting the styled document further comprises:

obtaining the semantic context corresponding to the raw document, wherein the semantic context comprises a raw document supplemental context;

generating a context-augmentation prompt to the LLM including an instruction to augment the styled document with at least one section heading corresponding to the semantic context, and content corresponding to the semantic context; and processing the context-augmentation prompt, the semantic context, and the styled document by the LLM to obtain the discoverable document.

7. The method of claim 1, further comprising:

responsive to the discoverable document having the document readiness score greater than the document readiness threshold, generating a vector embedding corresponding to the discoverable document, to obtain a discoverable document vector embedding, and storing the discoverable document vector embedding in a document vector store.

8. The method of claim 1, wherein generating the answer to the user query from the discoverable document embedding further comprises:

generating an answer-generation prompt for the LLM including a first instruction to convert the user query embedding and the discoverable document embedding into corresponding natural language utterances, processing the answer-generation prompt, the user query embedding and the discoverable document embedding by the LLM to obtain the corresponding natural language utterances, generating a summarization prompt for the LLM including a second instruction to summarize the corresponding natural language utterances into the answer, and processing the summarization prompt and the corresponding natural language utterances by the LLM to obtain the answer.

9. A system, comprising:

at least one computer processor;

a large language model (LLM), executing on the at least one computer processor;

a document improvement engine, executing on the at least one computer processor, and configured to iteratively execute a pre-processing document processing loop, by causing the at least one computer processor to perform operations comprising:

analyzing, via the LLM, a raw document based on a raw document type of the raw document, to obtain a document readiness score of the raw document, responsive to the document readiness score of the raw document being less than a document readiness threshold, performing operations comprising:

generating a modification recommendation prompt to the LLM including an instruction to generate a modification recommendation based on evaluating the raw document against a document rubric, processing the modification recommendation prompt by the LLM to obtain the modification recommendation, modifying, via the LLM, the raw document in accordance with the modification recommendation obtained from analyzing the raw document to obtain a modified document, applying, via the LLM, a document style rule set to the modified document to obtain a styled document when the modified document satisfies a similarity threshold with respect to the raw document, augmenting, via the LLM, the styled document with a semantic context to obtain a discoverable document, and generating by the LLM, a second document readiness score corresponding to the discoverable document, until the second document readiness score is greater than the document readiness threshold; and a document discovery engine, comprising an embedding generator, a searcher, and an answer generator, and executing on the at least one computer processor, wherein the document discovery engine is configured to execute a post-processing document processing phase, comprising:

obtaining, from the embedding generator, a user query embedding of a user query in a user chat history, obtaining, from the searcher, a discoverable document embedding corresponding to the discoverable document, wherein the discoverable document embedding is semantically similar to the user query embedding, generating an answer by the answer generator, via the LLM, to the user query from the discoverable document embedding, and triggering the document improvement engine to execute the pre-processing document processing loop to update the discoverable document with the semantic context comprising the user chat history.

10. The system of claim 9, wherein the document improvement engine is further configured to analyze the raw document by:

evaluating, the raw document based on the document rubric by:

generating a document-analysis prompt for the LLM, including an instruction to evaluate the raw document based on the document rubric, sending the document-analysis prompt, the raw document, and the document rubric to the LLM, and processing, by the LLM, the document-analysis prompt, the raw document, and the document rubric, to generate the document readiness score corresponding to the raw document.

11. The system of claim 9, wherein the document improvement engine is further configured to modify the raw document by:

generating a prompt to the LLM including an instruction to modify the raw document based on the modification recommendation, and processing the prompt, the raw document, and the modification recommendation by the LLM to obtain the modified document.

12. The system of claim 9, wherein the document improvement engine is further configured to iteratively execute the pre-processing document processing loop by:

discarding a subsequent modified document in a subsequent iteration, responsive to a similarity score being less than the similarity threshold.

13. The system of claim 9, wherein the document improvement engine is further configured to obtain a styled document by:

generating, a style-modification prompt to the LLM including an instruction to modify the modified document based on the document style rule set, and processing the style-modification prompt, the document style rule set and the modified document by the LLM to obtain the styled document.

14. The system of claim 9, wherein the document improvement engine is further configured to augment the styled document by:

obtaining the semantic context corresponding to the raw document, wherein the semantic context comprises a raw document supplemental context, generating, a context-augmentation prompt to the LLM including an instruction to augment the styled document with at least one section heading corresponding to the semantic context, and content corresponding to the semantic context, and processing the context-augmentation prompt, the semantic context, and the styled document by the LLM to obtain the discoverable document.

15. The system of claim 9, wherein the document discovery engine is further configured to:

responsive to the discoverable document having the document readiness score greater than the document readiness threshold, generate, by the embedding generator, a vector embedding corresponding to the discoverable document, to obtain a discoverable document vector embedding, and store the discoverable document vector embedding in a document vector store.

16. The system of claim 9, wherein the document discovery engine is further configured to generate the answer to the user query from the discoverable document embedding by:

generating, by the answer generator, an answer-generation prompt for the LLM including a first instruction to convert the user query embedding and the discoverable document embedding into corresponding natural language utterances, processing the answer-generation prompt, the user query embedding and the discoverable document embedding by the LLM to obtain the corresponding natural language utterances, generating, by the answer generator, a summarization prompt for the LLM including a second instruction to summarize the corresponding natural language utterances into the answer, and processing the summarization prompt and the corresponding natural language utterances by the LLM to obtain the answer.

17. A method, comprising:

iteratively executing, by a document improvement engine, a pre-processing document processing loop, comprising:

obtaining, from a data repository, a raw document, analyzing, via a large language model (LLM), the raw document, using a document rubric corresponding to a raw document type to obtain a document readiness score of the raw document, responsive to the document readiness score of the raw document being less than a document readiness threshold, performing operations comprising:

modifying, via the LLM, the raw document based on a modification recommendation obtained from analyzing the raw document to obtain a modified document, wherein the modified document comprises a modified version of the raw document, modified in accordance with the modification recommendation, obtaining a similarity score corresponding to a semantic similarity of the modified document with respect to the raw document, responsive to the similarity score being greater than a similarity threshold, retaining the modified document, applying, via the LLM, a document style rule set to the modified document to obtain a styled document, augmenting, via the LLM, the styled document with a semantic context to obtain a discoverable document, and generating by the LLM, a second document readiness score corresponding to the discoverable document, until the second document readiness score is greater than the document readiness threshold; and executing, by a document discovery engine, comprising an embedding generator, a searcher and an answer generator, a post-processing document processing phase, comprising:

obtaining, from the embedding generator, a user query embedding of a user query in a user chat history from an AI assistant application, obtaining, from the searcher, a discoverable document embedding corresponding to the discoverable document, wherein the discoverable document embedding is semantically similar to the user query embedding, generating, by the answer generator, an answer via the LLM, to the user query from the discoverable document embedding, and triggering the document improvement engine to execute the pre-processing document processing loop to update the discoverable document with the semantic context comprising the user chat history.

* * * * *